(12) United States Patent
Comstock et al.

(10) Patent No.: US 7,373,379 B2
(45) Date of Patent: *May 13, 2008

(54) MEDIA ROLE MANAGEMENT IN A VIDEO CONFERENCING NETWORK

(75) Inventors: Elizabeth M. Comstock, Acton, MA (US); William L. Kruger, Westford, MA (US); Brian A. Howell, Marblehead, MA (US); Stephen C. Botzko, Reading, MA (US); Robert V. Seiler, Somerville, MA (US); Jeffrey G. Bernstein, Middleton, MA (US); Gary J. Sullivan, Redmond, WA (US)

(73) Assignee: Polycom, Inc., Pleasanton, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 10/727,931

(22) Filed: Dec. 4, 2003

(65) Prior Publication Data

US 2004/0083266 A1   Apr. 29, 2004

Related U.S. Application Data

(62) Division of application No. 09/556,359, filed on Apr. 24, 2000, now Pat. No. 6,704,769.

(51) Int. Cl.
G06F 13/00 (2006.01)
(52) U.S. Cl. .................. 709/204; 709/224; 709/238
(58) Field of Classification Search .................. None
See application file for complete search history.

(56) References Cited

U.S. PATENT DOCUMENTS

| | | | | |
|---|---|---|---|---|
| 5,557,725 A | * | 9/1996 | Ansberry et al. ........... | 715/755 |
| 5,748,618 A | * | 5/1998 | Rothrock ..................... | 370/260 |
| 5,822,527 A | * | 10/1998 | Post ........................... | 709/206 |
| 5,907,324 A | | 5/1999 | Larson et al. ................ | 345/330 |
| 6,128,649 A | * | 10/2000 | Smith et al. ................. | 709/217 |
| 6,201,859 B1 | * | 3/2001 | Memhard et al. ......... | 379/93.21 |
| 6,237,026 B1 | * | 5/2001 | Prasad et al. ............... | 709/231 |
| 6,377,995 B2 | * | 4/2002 | Agraharam et al. ........ | 709/231 |
| 6,697,342 B1 | * | 2/2004 | Smyth et al. ................ | 370/260 |

FOREIGN PATENT DOCUMENTS

| | | |
|---|---|---|
| JP | 0 400 668 A3 | 1/1990 |
| WO | WO 00/33535 | 6/2000 |

OTHER PUBLICATIONS

"Combined Search and Examination Report Under Sections 17 & 18(3)" Aug. 9, 2004, The Patent Office (Great Brittan); 3 pages.

* cited by examiner

*Primary Examiner*—Viet D. Vu
(74) *Attorney, Agent, or Firm*—Wong, Cabello, Lutsch, Rutherford, & Brucculeri, LLP

(57) ABSTRACT

According to the principles of the invention, there is provided a system, apparatus, and method for managing media in a multimedia conferencing system according to media roles. Each media stream may be explicitly labeled with a role that describes the function or purpose of the stream, such as "people" or "content." The labels may be hierarchical, and may include layers for media type, additional media source description, and the like, e.g., "people/presenter" or "people/presenter/video/" A policy manager is provided for managing roles, such that the multimedia conference may be more effectively presented to participants. A token management system may also be provided so that control of the multimedia conference roles can be transferred during the conference.

17 Claims, 4 Drawing Sheets

MEDIA ROLE MANAGEMENT IN A VIDEO CONFERENCING NETWORK

CROSS-REFERENCE TO RELATED APPLICATION

The current application is a divisional application under 35 USC 121 of a utility patent application, Ser. No. 09/556,359 filed on Apr. 24, 2000, by the same inventors and with the same title, now U.S. Pat. No. 6,704,769 which is hereby incorporated by reference.

BACKGROUND OF THE INVENTION

1. Field of the Invention

This application relates to the field of multimedia conferencing, and more particularly to the field of role-based media management in a multimedia conferencing system.

2. Description of Related Art

Video conferencing systems are being used in a wide variety of settings to enable effective communication among participants (and audiences) at different geographical sites. Each video conferencing location includes a video camera, a display, a microphone, and a speaker. Each video conferencing location may also be equipped for data collaboration such as file sharing, a collaborative white board, and the like. The media making up a video conference, including audio, video, and data, may be directed through one or more multipoint conference units ("MCU's") that aggregate media streams from the various participants, and that mix and distribute appropriate streams to the participants and the audience. The system may employ one or more gateways to permit conferences that join participants across data networks and telecommunications networks.

Conventional video conferencing systems can provide a platform for a distributed collaborative environment shared by a number of participants. However, as a significant disadvantage, existing systems do not provide any mechanism for a moderator, or individual participants, to select media based on the media's role in the video conference. In current systems, a media source, such as a video source, an audio source, a computer screen, or a data source, has a logical identifier and a type. However, these identifiers provides very little guidance to a moderator or participant with respect to the nature of the source, and only by examining the stream can a determination of the source's role be made. Even this step may provide no indication of the role intended for the stream by its source. This poses particular difficulty in multi-point video conferences, where any number of media streams may be present, and a participant has no mechanism for discerning the role of each stream.

There remains a need for a multimedia conferencing system that permits management of a multimedia conference based upon the role of media streams.

SUMMARY OF THE INVENTION

According to the principles of the invention, there is provided a system, apparatus, and method for managing media in a multimedia conferencing system according to media roles. Each media stream may be explicitly labeled with a role that describes the function or purpose of the stream, such as "people" or "content." The labels may be hierarchical, and may include layers for media type, additional media source description, and the like, e.g., "people/presenter" or "people/presenter/video." A policy manager is provided for managing roles, such that the multimedia conference may be more effectively presented to participants. A token management system may also be provided so that control of the multimedia conference roles can be transferred during the conference.

A method for managing media roles in a multimedia conferencing network according to the principles of the invention includes receiving a data signal from a media source; determining a role for the data signal, the role being indicative of a purpose of the media source in a multimedia conference; generating a label for the data signal, based upon the role; combining the label and the data signal to provide a labeled signal; and transmitting the labeled signal.

In another aspect, a method for displaying a multimedia conference according to the principles of the invention includes receiving a multimedia conference signal comprising a plurality of data signals, each data signal including a media stream and a label, the label further including a role for the media stream; determining a policy, the policy including one or more roles; and displaying selected ones of the plurality of data signals that have labels corresponding to the roles of the policy.

In one aspect, a data signal embodied on a multimedia conferencing carrier signal according to the principles of the invention includes a media stream, the media stream being generated by a media source within a multimedia conference; a label for the media stream, the label including a role that defines a function of the media stream in the multimedia conference.

In another aspect, a multimedia conferencing terminal according to the principles of the invention includes a media display; a plurality of output switches, each output switch receiving one or more media outputs, each output switch responsive to an output control signal for selecting one or more of the one or more media outputs to output as switched outputs, thereby providing one or more switched outputs to the media display; and a policy manager, the policy manager applying a predetermined policy to generate the output control signal, and the policy manager providing the output control signal to the plurality of output switches, whereby the media display is controlled according to the predetermined policy.

In another aspect, a multimedia conferencing system according to the principles of the invention includes a multipoint conference unit; and a plurality of multimedia conferencing terminals connected in a communicating relationship with the multipoint conference unit, each multimedia conferencing terminal including a policy manager, the policy manager applying a predetermined policy to a plurality of media streams associated with a multimedia conference among the plurality of multimedia conferencing terminals.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF CERTAIN ILLUSTRATED EMBODIMENT(S)

To provide an overall understanding of the invention, certain illustrative embodiments will now be described, including role management in an H.320/H.323 video conferencing system. However, it will be understood by those of ordinary skill in the art that the methods and systems described herein can be suitably adapted to other systems that would benefit from role-based management of multimedia, including other data network or telecommunications-based video conferencing platforms. The terms "media" and "multimedia," as used herein, are intended to refer to any of the known media types, individually or collectively, such as motion video, still video, audio, shared data, shared applications, and any other media in open or proprietary standards that may be communicated over a network. Further, the term "display," as used herein, is intended to refer to the display of video content, as well as the presentation of audio content or any other reproduction, display, playing, or other rendering of content, or any device for such rendering of content, that might be carried by the media or multimedia described above.

Figure 1:
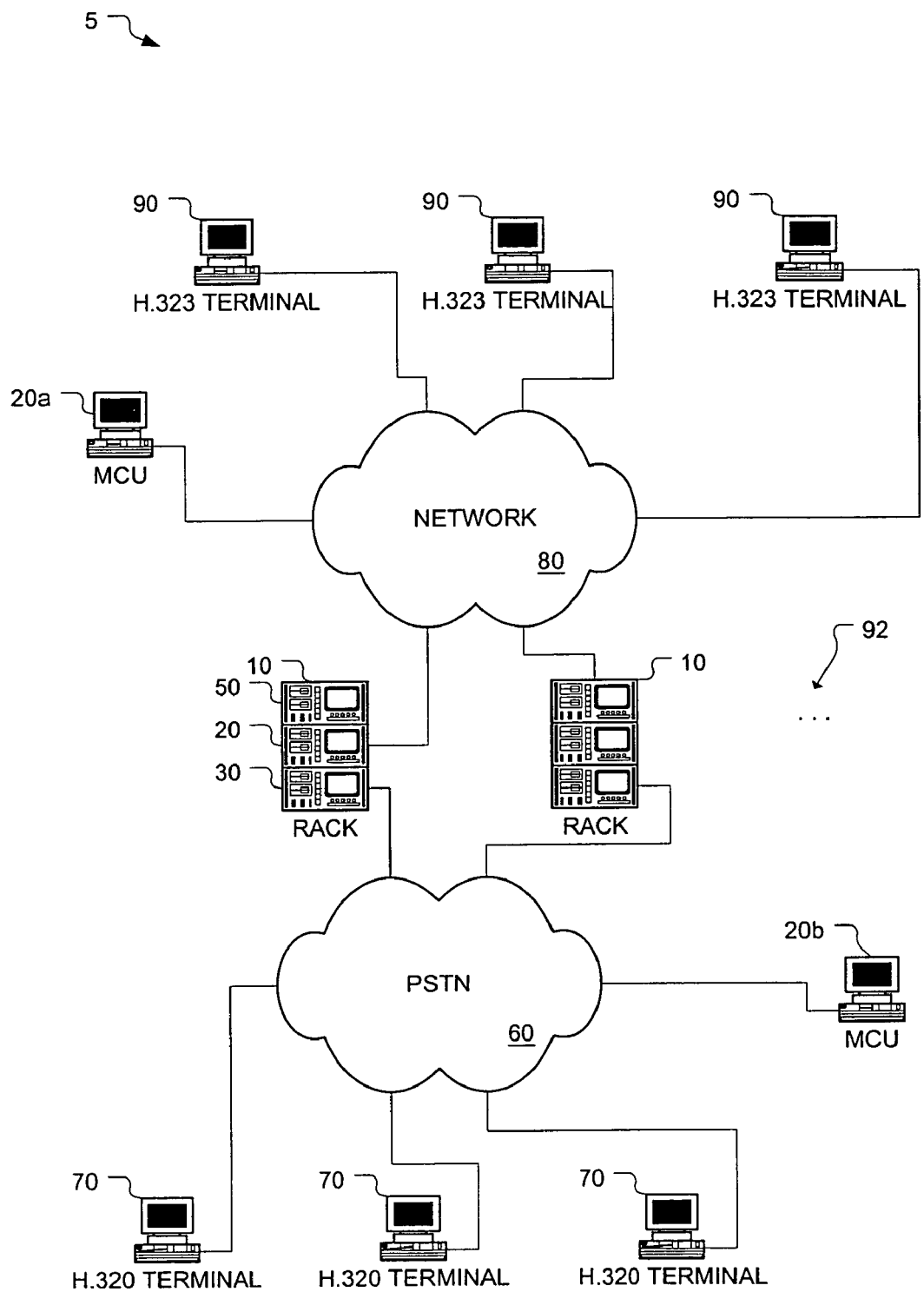
FIG. 1 shows a video conferencing system that may be used with the invention.

FIG. 1 shows a video conferencing system that may be used with the invention. In the video conferencing network 5, a rack 10 includes a multi-point conference unit ("MCU") 20, a gateway 30, and hardware/software for other services. The gateway 30 provides one or more connections to the Public Switched Telephone Network 60, for example, through high speed connections such as Integrated Services. Digital Network ("ISDN") lines, Ti lines, or Digital Subscriber Lines ("DSL"). A plurality of PSTN video conferencing ("VC") terminals 70 are also connected in a communicating relationship with the PSTN 60, and are accessible using known telecommunications dialing and signaling services. The MCU 20 is connected in a communicating relationship with the Internet 80. A plurality of Internet Protocol ("IP") VC terminals 90 are also connected in a communicating relationship with the Internet 80, and are accessible by using known data networking techniques, such as IP addressing.

It will be appreciated that, although the following description refers to an IP network 80 and the PSTN 60, any network for connecting terminals may be usefully employed according to the principles of the invention. The IP network 80, for example, may be any packet-switched network, or any other network for carrying data, and the PSTN 60 may be any circuit-switched network, or any other network for carrying circuit-switched signals or other data. It will additionally be appreciated that the PSTN 60 and/or the IP network 80 may include wireless portions, or may be completely wireless networks. It will also be appreciated that the principles of the invention may be usefully employed in any multimedia conferencing system.

It will be appreciated that the components of the rack 10, such as the MCU 20, the gateway 30, and the other services 50, may be realized as separate physical machines, as separate logical machines on a single computer, or as separate processes on a single logical machine, or some combination of these. Additionally, each component of the rack 10, such as the gateway 30, may comprise a number of separate physical machines grouped as a single logical machine, as for example, where traffic through the gateway 30 exceeds the data handling and processing power of a single machine. A distributed video conferencing network may include a number of racks 10, as indicated by an ellipsis 92.

In one embodiment, each PSTN VC terminal 70 uses an established telecommunications video conferencing standard such as H.320. H.320 is the International Telecommunication Union telecommunications ("ITU-T") standard for sending voice and audio over the PSTN 60, and provides common formats for compatible audio/video inputs and outputs, and protocols that allow a multimedia terminal to utilize the communications links and synchronize audio and video signals. The T.120 standard may also be used to enable data sharing and collaboration. Each PSTN VC terminal 70 may include inputs such as a microphone, video camera, and keyboard, and may include outputs such as a display and a speaker. The H.320 and T.120 standards may be implemented entirely in software on a computer, or in dedicated hardware, or in some combination of these. Each PSTN VC terminal 70 may include coder/decoders ("codecs") for different media. Video codecs may include codecs for standards such as H.261 FCIF, H.263 QCIF, H.263 FCIF, H.261 QCIF, and H.263 SQCIF. These are well known teleconferencing video standards that define different image size and quality parameters. Audio codecs may include codecs for standards such as G.711, G.722, G.722.1, and (G.723.1. These are well known teleconferencing audio standards that define different levels of quality for audio data transmission. Any other proprietary or non-proprietary standards currently known, or that may be developed in the future, for audio, video, and data may likewise be used with the invention, and are intended to be encompassed by this description. For example, current H.320 devices typically employ monaural sound, however, the principles of the invention may be readily adapted to a conferencing system employing stereo coding and reproduction, or any other spatial sound representation.

The gateway 30 communicates with the PSTN 60, and translates data and other media between a form that is compatible with the PSTN 60 and a form that is compatible with the Internet 80, including any protocol and media translations required to transport media between the networks.

Each IP VC terminal 90 uses an established data networking video conferencing standard such as H.323. H.323 is the ITU-T standard for sending voice and audio over data networks using IP, and provides common formats for compatible audio/video inputs and outputs, and protocols that allow a multimedia terminal to utilize the communications links and synchronize audio and video signals. The T.120 standard may also be used to enable data sharing and collaboration. Each IP VC terminal 90 may include inputs such as a microphone, video camera, and keyboard, and may include outputs such as a display and a speaker. The H.323 and T.120 standards may be implemented entirely in software on a computer, or in dedicated hardware, or in some combination of these. Each IP VC terminal 90 typically also includes standard audio and video codecs, such as those described for the PSTN VC terminals 70.

The MCU 20 communicates with the IP VC terminals 90 over the Internet 80, or with the PSTN VC terminals 70 over the PSTN 60. The MCU 20 includes hardware and/or software implementing the H.323 standard (or the H.320 standard, where the MCU 20 is connected to the PSTN 60) and the T.120 standard, and also includes multipoint control for switching and multiplexing video, audio, and data streams in a multimedia conference. The MCU 20 additionally includes hardware and/or software to receive from, and transmit to, PSTN VC terminals 70 connected to the gateway 30. As shown in FIG. 1, an MCU 20 may reside on one of the racks 10, or may be located elsewhere in the network, such as MCU's 20a and 20b. It will be appreciated that an MCU 20 may also reside on one of the PSTN VC terminals 70, or one of the IP VC terminals 90, and may be implemented in hardware, software, or some combination of these.

The rack 10 may provide additional services for use in a video conferencing network. These may include, for example, audio/video coder/decoders ("codecs") that are not within the H.323 or H.320 standards, such as the G2 encoder and streamer for use with a proprietary streaming system sold by RealNetworks, Inc., and a Windows Media codec for use with proprietary media systems sold by Microsoft Corporation. Other services may include, for example, a directory server, a conference scheduler, a database server, an authentication server, and a billing/metering system.

Figure 2:
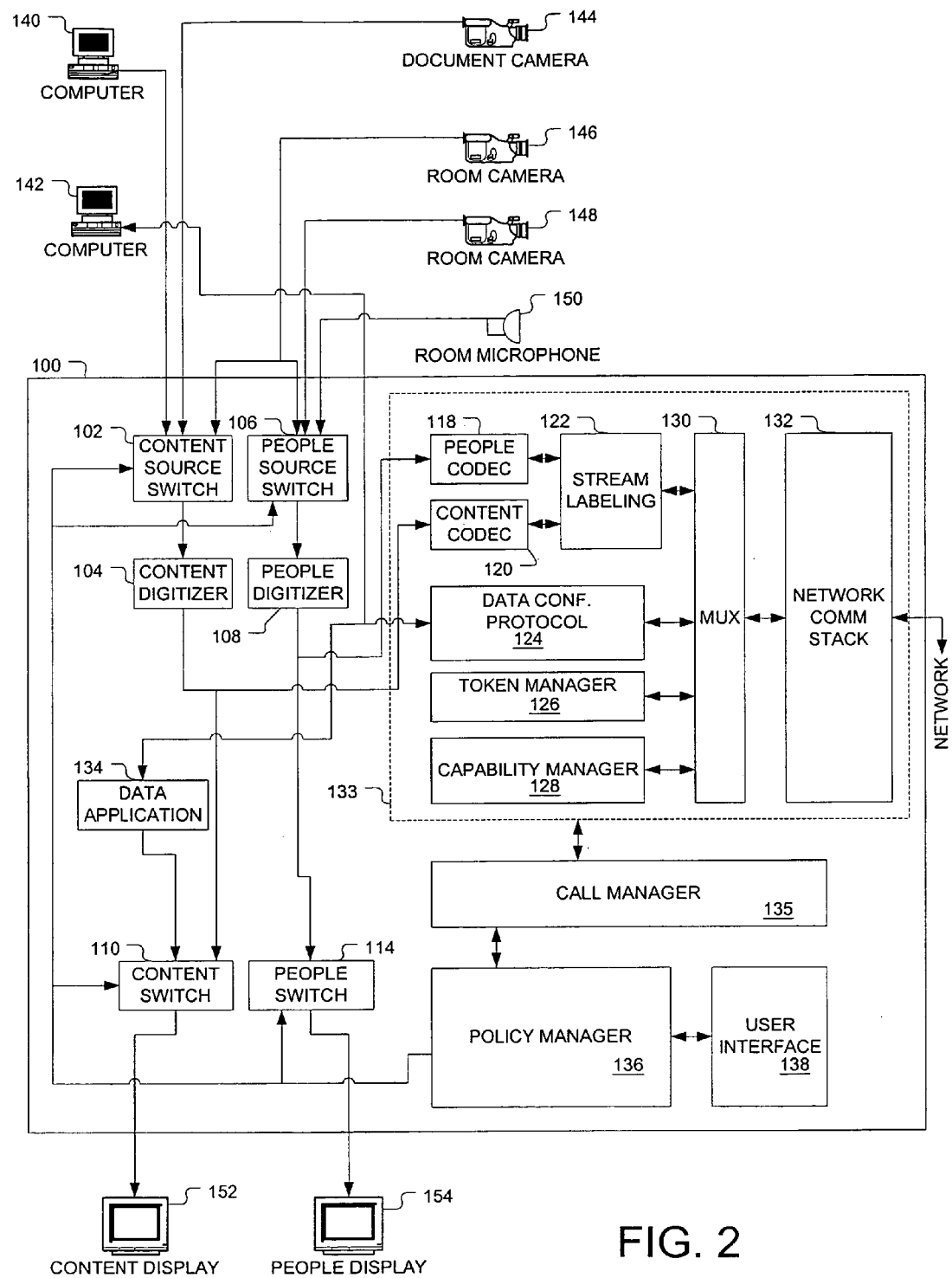
FIG. 2 is a block diagram of a video conferencing terminal according to the principles of the invention.

FIG. 2 is a block diagram of a video conferencing terminal according to the principles of the invention. The video conferencing terminal 100 operates as an end terminal in a video conferencing network, and generally includes the capability to receive and display video conference media from remote sources, and to generate video conference media locally from audio/visual or other inputs. The video conferencing terminal 100 may be an H.320 terminal or an H.323, with some differences in operation as noted below, or the video conferencing terminal 100 may be another computer or system capable of operating as a terminal in a video conferencing network.

As will be appreciated from the foregoing, role management according to the principles of the invention may be practiced on a combined H.323/H.320 video conferencing network, and may be practiced in a point-to-point conference directly between two terminals, with no MCU 20 and no gateway 30, or in a multi-point conference. It will be further appreciated that, although the following example describes management of two roles, people and content, a video conferencing terminal 100 may be adapted by one skilled in the art to manage a number of additional and/or different roles without departing from the scope of the invention described herein. In addition, although a video conferencing terminal is described below, a terminal may be any terminal used for conferencing over a network, such as an audio terminal, a data terminal, or any other type of terminal.

The video conferencing terminal 100, or "terminal 100" for short, may include a content source switch 102, a content digitizer 104, a people source switch 106, and a people digitizer 108, which may operate collectively to handle media sources connected to the video conferencing terminal 100. The terminal 100 may also include a content switch 110 and a people switch 114 which may operate collectively to handle output to display devices connected to the terminal 100. The terminal 100 also includes a people codec 118, a content codec 120, a stream labeling unit 122, a data conferencing protocol stack 124, a token manager 126, a capability manager 128, a multiplexer 130, a network communication stack 132, which may be collectively referred to as a protocol stack manager 133. The terminal may also include a data application 134 and a call manager 135. A policy manager 136 manages policies according to the principles of the invention, as will be explained in more detail below. A user interface 138 may be provided to control operation of the policy manager 136. It will be appreciated that, although the policy manager 136 is shown residing on the terminal 100, that the policy manager 136 may reside anywhere in the conferencing network 5, such as on an MCU 20, or at an Internet Service Provider ("ISP") within the network 80.

It will be appreciated that, except for the above-mentioned components that require analog-to-digital or digital-to-analog conversion for inputs and outputs from the terminal 100, each of the above components of the terminal 100 may be implemented entirely in software on a computer, or in dedicated hardware, or in some combination of these.

The content source switch 102 and the people source switch 106 receive media signals from a variety of sources connected to the terminal 100. A number of computers, such as a first computer 140 and a second computer 142, may provide media signals. For example, the first computer 140 may provide video or audio data to the content source switch 102. The second computer 142 may provide data or file sharing media, which may be provided directly to the data conferencing protocol stack 124. The second computer 142 may also receive shared data through the data conferencing protocol stack 124 using, for example, the T.120 data sharing standard. A document camera 144 may provide video data to the content source switch 102, showing, for example, a document used as content in a video conferencing presentation. One or more room cameras 146, 148 may provide video data to the people source switch 106, for showing views of a room involved in a video conferencing presentation or people in the room. As is seen in FIG. 2, one of the room cameras 146 may, if appropriate, also provide video data to the content source switch 102 where, for example, the room camera 146 is directed to a chalkboard being used by a presenter. One or more room microphones 150 may provide audio data for use in the video conference. It will be appreciated that sources may include additional computers, cameras, and microphones, as well as other media sources such as a video cassette recorder or digital versatile disk player.

A content display 152 may be connected to the terminal 100, and more particularly, to the content switch 110 of the terminal 100, to display content of the video conference. A people display 154 may also be connected to the terminal 100, and more particularly, to the people switch 114 of the terminal 100, to display people associated with the video conference. Each display may include, for example, a television or computer monitor, speakers, or any other display devices. It will be appreciated that a single display device may display more than one media signal. For example, a single visual display device may be configured to display multiple roles, for example by displaying one role in a picture-in-picture window within a display of another role.

The user interface 138 permits a user of the terminal 100 to initiate a video conference, or to respond to a call from another terminal 70, 90 in the network 5 of FIG. 1. As is known in the art, the user interface 138 may include controls for adjusting volumes, moving cameras, selecting various media sources, initiating conferences, and the like. According to the principles of the invention, the user interface 138 may also include controls for role management, including, for example, an ability to select and deselect sources of particular roles, and to control a token that is provided for exclusive control of a role, as will be explained in further detail below. Control of media source selection may also be automated in part, such as when a video cassette recorder is started. The user interface 138 may be connected to a display, as well as control devices such as a mouse and a keyboard, such that a user may monitor a video conference and control operation of the conference. The user interface 138 is connected to the policy manager 136 and other components of the terminal 100.

The content source switch 102 and the people source switch 106 are controlled to select appropriate media sources for management according to roles. The content source switch 102 operates under control of a content policy administered by the policy manager 136. The switch 102 receives media from several sources, as noted above. The content source switch 102 also receives a control signal from the policy manager 136. The content source switch 102 selects specific ones of the received media, typically a video source and an audio source, according to the control signal and transmits the selected sources to the content digitizer 104 where analog signals are converted into digital signals if required. The people source switch 106 operates under control of a people policy administered by the policy manager 136. The switch 106 receives media from several sources, as noted above. The people source switch 106 also receives a control signal from the policy manger 136. The people source switch 106 selects specific ones of the received media according to the control signal, and transmits the selected sources to the people digitizer 108 where the sources are converted to digital signals if required.

The content switch 110 and the people switch 114 operate to select media for output to the content display 152 and the people display 154 according to policies administered by the policy manger 136. More particularly, the content switch 110 operates under control of a content policy administered by the policy manager 136. The switch 110 receives content media from the content digitizer 104 or the content codec 120 (for network data), which may include audio, visual, or other media. The content switch 110 also receives a control signal from the policy manager 136. The content switch 110 selects specific ones of the received media, typically a video source and an audio source, according to the control signal and converts the media into a form suitable for the content display 152. The people switch 114 operates under control of a people policy administered by the policy manager 136. The switch 114 receives media from the people digitizer 108 and the people codec 118 (for network data), which may include audio, visual, or other media. The people switch 114 also receives a control signal from the policy manger 136. The people switch 114 selects specific ones of the received media according to the control signal, and converts the media into a form suitable for the people display 154.

The capability manager 128 may be controlled by the policy manager 136. According to the H.245 Control Protocol, capability messages may be exchanged between video conferencing terminals such as the terminals 70, 90 in the network 5 of FIG. 1. Such a capability exchange may be modified according to the principles of the invention to include a non-standard exchange of people/content capability, or, where other roles are used, role management capability. In one embodiment, people/content capability is signaled as "NS-CAP/PeopleContent." The mutual possession of this capability between two end terminals permits the end terminals to use people/content ("P/C") signaling during a video conference. The capability manager 128 may also define the number of media streams supported and roles supported for each media stream capability. By exchanging this information, terminals 70, 90 in the network 5 of FIG. 1 may effectively arbitrate an agreed labeling scheme for a video conference. It will be appreciated by those skilled in the art that H.323 terminals, for example, support two video streams while H.320 terminals do not, and that a non-standard extension to a standard such as H.320 may be applied by the capability manager 128 to support multiple video streams according to the principles of the invention. It should further be appreciated that the H.245 protocol is an example, and that other control protocols may be used to signal capability exchange among terminals in a conferencing system according to the principles of the invention.

The people codec 118 and the content codec 120 may implement well known audio/video coding standards such as H.261 or H.263 for video and G.722 or G.723.1 for audio. The people codec 118 and the content codec 120 may also implement other proprietary or non-proprietary coding standards. The codecs decode incoming audio and video signals received from the network communication stack 132, and encode signals from the content digitizer 104 and the people digitizer 108 for transmission to the stream labeling unit 122.

Data, such as the shared data received from the second computer 142, may be communicated to the data conferencing protocol stack 124, which operates according to the well known T.120 protocol. The data conferencing protocol stack 124 may transmit the data to the multiplexer 130. This communication may be bi-directional, and data may be received from the network communication stack 132 for use in the terminal 100, all in accordance with the T.120 protocol. Where locally generated data, such as that from the second computer 142, is to be viewed in the video conference, the data application 134 may be used to convert the data into a form suitable for the content display 152. The data application 134 may be any application running on a terminal 100 that uses shared data in a conference. Actual display of the data on the content display 152 is, as with other media, controlled by the policy manager 136.

Where a role such as content is preferably provided under control of a single terminal 100 (or optionally, an MCU 10 of FIG. 1), or where the source of a role is to be transferred during a conference, a token may be established such that a "token holder" is the provider of that role in the conference. Creation and distribution of the token is managed by the token manager 126. Token exchange among terminals in a video conferencing system is described in further detail with reference to FIG. 3 below.

Where terminals have exchanged appropriate capability information to support P/C conferencing, the stream labeling unit 122 of the terminal 100 may operate to label outgoing streams, and to provide the policy manager 136 with information concerning labels on incoming streams. Labels may include, for example, a people label, a content label, a mixed label, or an any label. Labeling may also include a list of several different roles which may be included within a logical channel of a conference. The any label may assist in capability exchange during call setup, that is, the any label may be used to indicate availability of a stream for any known role, without being used to label a stream during media transmission. The H.320 and the H.323 protocols may be extended to include label definitions that may be used to label data streams according to the principles of the invention. Other techniques for including data with a media stream are also known in the art, and may be used with present invention.

The multiplexer 130 may control channels within the H.323 or H.320 protocol according to known techniques. In particular, the multiplexer 130 may combine the signals from the stream labeling unit 122, the data conferencing protocol stack 124, the token manager 126, and the capability manager 128 into a form suitable for transmission to the network communication stack 132. The multiplexer 130 may similarly unmix received signals at the terminal 100 into different media streams. The multiplexer 130 is connected in a communicating relationship with a network communication stack 132 that may implement one or more standard network protocols, such as the Internet Protocol ("IP"), the Integrated Services Digital Network ("ISDN") protocol, or some other standard or nonstandard protocol suitable for a network such as the Internet 80 or the PSTN 60.

The terminal 100 may also includes a call manager 135, which communicates with various components in the protocol stack manager 133, and may implement well known video conferencing functionality, such as call initiation (using the H.245 Control Protocol), codec selection, and the like. The call manager 135 may also communicate with the policy manager 136 to control selection of logical channels by the protocol stack manager 133.

The policy manager 136 may operate to coordinate connection establishment and termination, and the policy manager 136 may operate to control a video conference according to one or more policies. In general, a policy is any rule, algorithm, or combination or collection of rules and algorithms, that may be applied to media streams in a video conference. This may include rules and algorithms that relate to assigning roles to media streams, as well as rules and algorithms that relate to handling media streams according to assigned roles.

Upon the platform described above, the policy manager 136 may effectuate a policy for assigning incoming streams to various roles, such as people or content, and providing labels according to these roles. The policy manager 136 may likewise implement a policy for displaying media streams bearing these labels. For example, content might be directed to the content display 152 and people might be directed to the people display 154. Application of policies may use information such as the number of displays available and the resolution, size, and capabilities of a display. For example, if only one display is available, a portion of the display may be reserved for content. Or the policy manager 136 might prompt a user, through the user interface 138, to select a particular screen partition for each role.

The policy manager 136 may provide more complex policies. For example, a people policy may include an assignment of all people sources to the people display 154. The policy may permit a user to select, through the user interface 138, any number of people to display through the people display 154, and may allow the user to select specific participants for display. Or the policy manager 136 may automatically select a particular display configuration with, for example, a remote site and the local site in a small, picture-in-picture styled window. A separate policy may be created for content. For example, according to the policy, content might always be displayed on the content display 152. The policy manager 136 may require that only one content source may be selected at a certain time. The policy manager 136 may further require that all participating terminals display content on their own local content displays. The policy manager 136 may further permit each terminal to control, i.e., define media sources for, its own content source. The policy manager 136 may further permit control of the video conference content to pass from terminal to terminal.

It will be appreciated that a terminal 100 according to the principles of the invention may provide control over sources categorized according to the roles, people and content, but that other categorizations are possible, and any number and type of roles for media maybe established and controlled according to the invention. In the people/content embodiment described herein, people relates to participants engaged in the video conference, while content relates to subject matter under discussion in the video conference. In general a role may be assigned to a group of media that serve the same purpose in the video conference, may be managed and controlled as a set independent of other roles, and may be communicated and rendered simultaneously. It will be appreciated that additional roles may also require additional source switches and output switches in the terminal 100.

In some situations, it may further be useful to define hierarchical roles, i.e., subordinate classifications within a role. For example, where a number of participants in a video conference take turns presenting information, a classification of people/presenter and people/audience may be provided. Using this classification, a presenter may be rendered differently by the terminal 100 than the other participants, and when one presenter is finished, the presenter may be re-classified as people/audience, at which point a different participant may assume the presenter role.

It should be appreciated that, although the policy manager 136 is shown in a terminal 100, that the policy manager 136 may reside in an MCU 20, in a rack 10, or elsewhere in a network of video conferencing terminals 100. It should further be appreciated that, although the policy manager 136 has been described within, an H.323/H.320 video conferencing network, that the policy manager 136 may be usefully practiced with any multimedia conferencing system.

Figure 3:
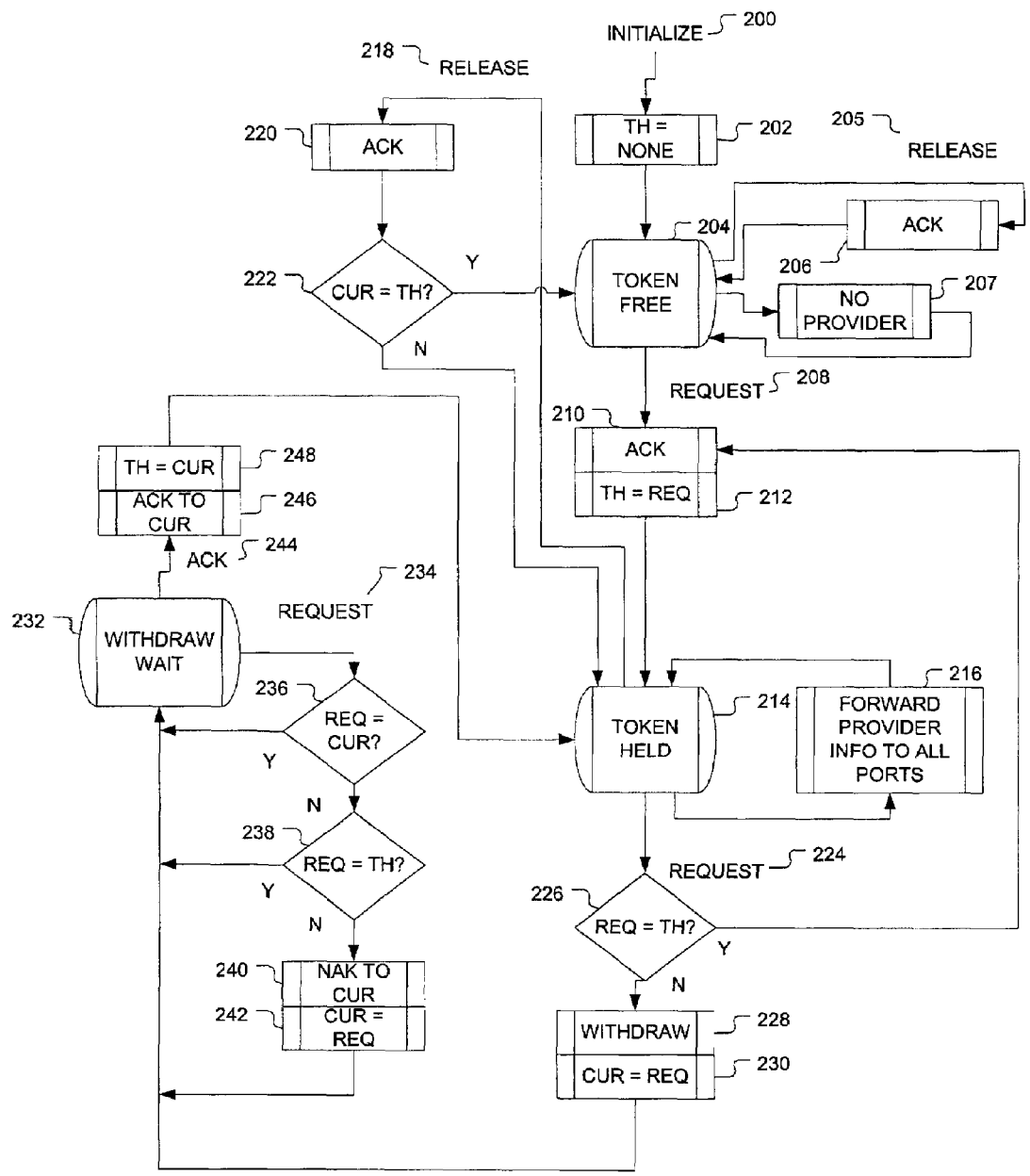
FIG. 3 is a state diagram of token management by an arbitrating multipoint conference unit according to the principles of the invention.

FIG. 3 is a state diagram of token management by an arbitrating multipoint conference unit according to the principles of the invention. In role-based video conferencing, it may be desirable to have the source of a role maintained exclusively at one location, or to periodically transfer the source of the role from one location to another. Accordingly, there is provided according to the principles of the invention a token which signifies the source of a particular role. As shown in FIG. 3, the MCU 10 may provide centralized control of the token, and ensure that the token is held by only one source of a role at a time.

In step 200, the system is initialized. In step 202, a token holder variable is set to none, indicating that no participant in a video conference currently holds the token. The process then proceeds to a token free state 204. If a release 205 is received in the token free state 204, the release 205 is acknowledged 206. In the token free state 204, the MCU 10 may periodically transmit a no provider message to terminals 100 participating in a video conference, as shown in step 207.

When a request 208 is received for the token, the process transmits an acknowledgement 210 of the request 208, and sets the token holder variable to the requesting terminal, as shown in step 212. The process then proceeds to the token held state 214. In this state 214, the process may forward information concerning the content provider, i.e., the requesting terminal, to other participants in the video conference, as shown in step 216. In the token held state 214, the process may receive a token release 218 from a video conference participant. In response, the process acknowledges the token release 218, as shown in step 220, and proceeds to determine whether the token release 218 was received from the current token holder, as shown in step 222. If the token release 218 was received from the current token holder, then the process returns to the token free state 204. If the token release 218 was not received from the current token holder, then the process returns to the token held state 214 and the token remains with the current token holder.

At some point, the process may receive a request 224 for the token while the process is in the token held state 214.

When this occurs, the process determines whether the request 224 is from the current token holder, as shown in step 226. If the request 224 is from the current token holder, then the process continues to step 210, where an acknowledgement is transmitted 210 and the token holder variable is again set to the requester 212. The process may then return to the token held state 214. If the request 224 is not from the current token holder, then the process continues to step 228 where a withdrawal request is transmitted to the token holder. A current requester variable is then set equal to the requester, as shown in step 230, and the system proceeds to a withdraw wait state 232.

In the withdraw wait state 232, the process waits for an acknowledgement of the withdrawal request from the token holder. If an acknowledgement 244 is received from the token holder, then the process transfers the token to the current requester. More particularly, the process transmits an acknowledgement to the current requester 246 that the token has been transferred, as shown in step 246, and the process sets the token holder variable equal to the current requester, as shown in step 248. The process may then continue to the token held state 214, where operation resumes as described above.

If, while in the withdraw wait state 232, a second request 234 for the token is received, the process continues to step 236. In step 236, the origin of the second request 234 is compared to the current requester. If they are the same, then the process returns to the withdraw wait state 232. If they are not the same, ten the system proceeds to step 238. In step 238, the origin of the second request 234 is compared to the token holder. If they are the same, then the process returns to the withdraw wait state 232. If they are not the same, then the process continues to step 240 where a not-acknowledged message is transmitted to the current requester. In subsequent step 242, the current requester is set equal to the origin of the second request 234, and the process returns to the withdraw wait state 232.

It should be appreciated that other token management systems are possible for the arbitrating MCU, and may include, for example, a queue for multiple requesters and a technique for overriding the queue. It should also be appreciated that token management may be arbitrated among the policy manager 136 of each terminal 100, without intervention from the MCU 10, such as when two terminals have formed a direct, point-to-point video conference. Alternatively, token management may be arbitrated through a slave MCU 10, such as when numerous MCU's are cascaded for a large video conference. Other token management schemes are known in the art and may be usefully practiced with a system operating according to the principles of the invention. Further adaptions may be made to address environments where, for example, a terminal within the system is not token-operable, or does not support roles according to the principles of the invention.

Figure 4:
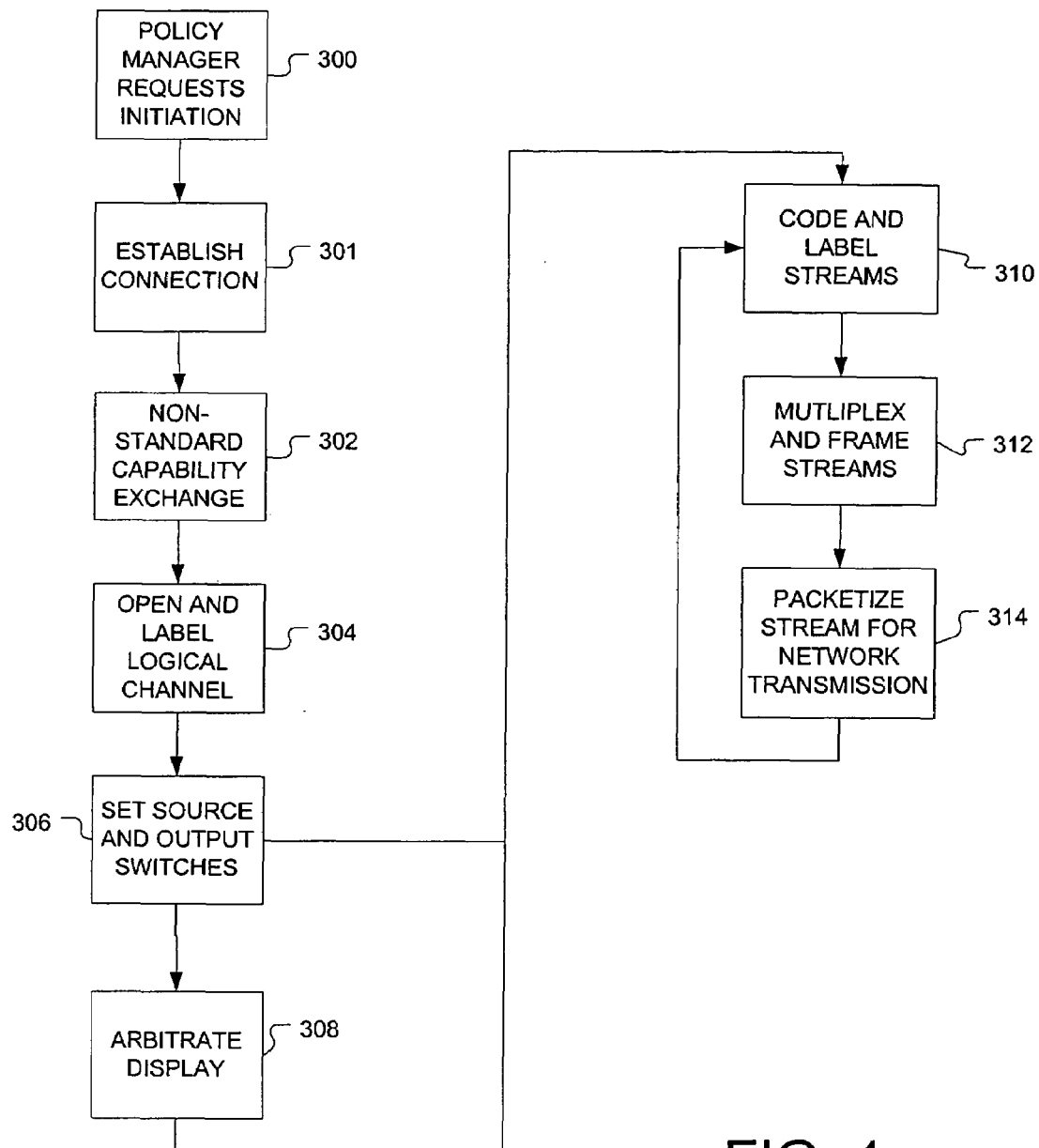
FIG. 4 is a flow chart showing a process for initiating a video conference that uses roles according to the principles of the invention.

FIG. 4 is a flow chart showing a process for initiating a video conference that uses roles according to the principles of the invention. It will be appreciated that, although the flow chart refers generally to a single channel, that the process may be repeated, or performed in several parallel processes, to open a number of channels. It will further be appreciated that a single channel may be assigned to a number of different roles, and may mix the streams for different roles, or switch between multiple roles. Labeling of a stream may also be changed to reflect different roles in a channel.

The process begins with step 300, where the policy manager 136 of a terminal 100 requests that the capability manager 128 initiate a video conference. This may be, for example, an H.323 call connection procedure, or any other connection procedure that may be used to connect terminals in a conference. In step 301, a connection is established between the terminal 100 and another terminal, or between the terminal 100 and on of the MCU's 20.

In step 302, the capability manager 128 performs a capabilities exchange. Capability exchange may be performed, for example, through capability set messages in the H.245 protocol control channel. In step 302, the terminals exchange information concerning available codecs and available media sources. As noted above, the P/C capability may also be signaled through extensions to the H.245 protocol. Where two terminals send (and acknowledge) the capability for P/C role management, the terminals may use P/C labels for media streams in a video conference. The terminals may then qualify all or some of the available media streams with appropriate P/C labels. Similarly, where other terminals send and acknowledge the capability for other roles, the terminals may use any supported role management labels for media streams. Any number of additional capabilities and labels may be defined for other roles, consistent with any input/output devices and processing capabilities of terminals 70, 90 within the network 5.

In step 304, a logical channel is opened. This may be accomplished using, for example, the H.245 protocol. In this step, an "openLogicalChannel" message is transmitted from a first terminal to a second terminal, including a transport address for the channel. The second terminal acknowledges the unidirectional logical channel in a message that includes a reverse transport address, thereby establishing bidirectional communication. The logical channels may be assigned to roles that use the labeling protocol described herein.

With logical channels between terminals established and assigned to roles, the process continues to step 306, where source and output switches are set. According to any policies established by the policy manager 136, specific media sources available at a terminal may be selected as sources, with labels assigned to the selected sources according to the policies. For example, a document camera may be selected and assigned a label such as content/video, where the document camera is directed at a document under discussion in a video conference. Output switches are also set in step 306. In particular, any media sources or streams available at the terminal may be selected for output. The determination of which sources are displayed is made by the policy manager 136, according to any established policies.

As shown in step 308, the policy manager 136 may optionally arbitrate display of media at the terminal 100. For example, the policy manager 136 may determine what output devices are available, and conform any mandatory and optional streams to the available devices.

As shown in step 310, selected sources are coded and labeled. Source streams are coded using any suitable codec identified during the capability exchange. The streams are labeled according to the established, or predetermined, policy. More particularly, a number of labels may be defined in, for example, an eight bit label definition. This may include a reserved bit, a label extension bit that is used to signify a label extension, a three bit reserved space, and a three bit label. The extension bit may be used where, for example, a hierarchical labeling scheme requires additional bits to uniquely identify each label within a hierarchy. The reserved space may be used to include further labeling functionality at a later time. The label may include designations of know media roles, for example:

| | |
|---|---|
| 000: | People |
| 001: | Content |
| 010: | Mixed |
| 011: | Any |
| 100-111: | Reserved |

These labels may be applied to media when the media is created. It will be appreciated that other roles may be used, and may include any role designations that may be usefully employed to manage a multimedia conference.

A media stream may be relabeled during use. If the media stream employs differential encoding, as in the image frames of a Moving Picture Experts Group ("MPEG") stream, a new full image (intra-frame) may be transmitted after relabeling, and a new image context may be established using the new full image. Additionally, a logical channel may be reassigned to a different role during use, and a signal may be provided for the logical channel that corresponds to the role to which the logical channel is assigned. In an embodiment of the invention, an assignment of a channel between two roles may be signaled by setting and resetting a bit, such as the 'doc' bit in the H.245 protocol.

The streams may be multiplexed and framed to provide framed data, as shown in step 312. As shown in step 314, the framed data may then be packetized for network transmission. Protocols are known for multiplexing, framing, and packetizing, and these known protocols may be used with a system according to the principles of the invention, or proprietary, non-standard, or other protocols may be used. The process may then return to step 310, where additional media may be coded, labeled, multiplexed, framed, and packetized as described above.

It will be appreciated by those skilled in the art that the above process describes a data networked video conferencing process using a known protocol, such as the H.323 protocol, and that certain adaptations may be made for other protocols such as the H.320 protocol. For example, the H.323 protocol includes capability for two video streams, and may accordingly use each video stream for a different role. Display of these two roles may then be managed by a participating terminal receiving the roles. By contrast, the H.320 protocol provides for only a single video stream. In this protocol, if two roles require video, and both roles are to be transmitted, then the video stream may alternate between the two roles, or the roles may be preprocessed to form a single video stream using, for example, a split frame or a picture-in-picture display. As another example, data may not be packetized for transmission over the PSTN 60 when using H.320. As will be appreciated by those skilled in the art, further adaptations may be appropriate for other multimedia conferencing protocols.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A multimedia conferencing device comprising:
a network interface for coupling with at least one multimedia conferencing device in a conference;
a switch coupled to the network interface, wherein the switch receiving one or more media streams from one or more sources, each switch responsive to a control signal for selecting one or more of media streams to output as switched outputs;
a policy manager coupled to the switch, wherein the policy manager generates the control signal for the switch according to a predetermined policy that depends at least in part on one or more labels associated with the one or more media streams and indicating a role of the one or more media streams; and
a capability manager coupled to the policy manager, wherein the capability manager negotiates the communication capability with the coupled multimedia conference device.

2. The multimedia conferencing device in claim 1, wherein the policy includes assigning hierarchical roles to streams, wherein the hierarchy of roles are indicated by labels. in the media streams.

3. The multimedia conferencing device in claim 1, wherein the switched outputs include at least people stream and content stream.

4. The multimedia conferencing device in claim 3, wherein the people stream is displayed on a people display; and wherein the content stream is displayed on a content display.

5. The multimedia conferencing device in claim 1, wherein the capability manager negotiates the supported levels of hierarchy of roles and collapses the unsupported levels of roles to the lowest supported level.

6. The multimedia conferencing device in claim 1, further comprising:
a token manager coupled to the capability manager, wherein each token represents the source of a role, wherein the token manager maintains the identity of the exclusive holder of the token within the conference.

7. The multimedia conferencing device in claim 1, further comprising:
a converter coupled to the network interface, wherein the converter is configured to detect a first role signal of a received media stream, convert the first role signal into a second role signal for the media stream, and retransmit the media stream.

8. The multimedia conferencing device in claim 1, further comprising:
a microphone, a camera, a speaker and a first video display, all of which are coupled to the switch.

9. The multimedia conferencing device in claim 8, wherein a video stream of a first role is displayed on a first section of the first video display; and
wherein a video stream of a second role is displayed on a second section of the first video display.

10. The multimedia conferencing device in claim 8, further comprising:
a second video display;
wherein a video stream of a first role is displayed on the first video display; and
wherein a video stream of a second role is displayed on the second video display.

11. A multimedia conferencing device comprising:
a network interface for coupling with at least one multimedia conferencing device in a conference;
a switch coupled to the network interface, wherein the switch receiving one or more media streams from one or more sources, each switch responsive to a control signal for selecting one or more of media streams to output as switched outputs;
a policy manager coupled to the switch, wherein the policy manager generates the control signal for the switch according to a predetermined policy that depends at least in part on one or more labels associated with the one or more media streams and indicating a role of the one or more media streams; and a converter coupled to the network interface, wherein the converter is configured to:

detect a first role signal of a received media stream; convert the first role signal into a second role signal for the media stream; and retransmit the media stream.

12. The multimedia conferencing device in claim 11, wherein the policy includes assigning hierarchical roles to streams, wherein the hierarchy of roles are indicated by labels in the media streams.

13. The multimedia conferencing device in claim 11 wherein the switched outputs include at least people stream and content stream.

14. The multimedia conferencing device in claim 13, wherein the people stream is displayed on a people display; and wherein the content stream is displayed on a content display.

15. The multimedia conferencing device in claim 11, further comprising:

a microphone, a camera, a speaker and a first video display, all of which are coupled to the switch.

16. The multimedia conferencing device in claim 15, wherein a video stream of a first role is displayed on a first section of the first video display; and wherein a video stream of a second role is displayed on a second section of the first video display.

17. The multimedia conferencing device in claim 15, further comprising:

a second video display;

wherein a video stream of a first role is displayed on the first video display; and wherein a video stream of a second role is displayed on the second video display.

* * * * *